(12) United States Patent
Niu et al.

(10) Patent No.: US 11,494,041 B2
(45) Date of Patent: Nov. 8, 2022

(54) TOUCH PANEL, MANUFACTURING METHOD THEREOF, AND ELECTRONIC DEVICE

(71) Applicants: Chengdu BOE Optoelectronics Technology Co., Ltd., Sichuan (CN); BOE TECHNOLOGY GROUP CO., LTD., Beijing (CN)

(72) Inventors: Wenxiao Niu, Beijing (CN); Qing Gong, Beijing (CN); Xu Lu, Beijing (CN); Lianbin Liu, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 54 days.

(21) Appl. No.: 16/958,967

(22) PCT Filed: Aug. 13, 2019

(86) PCT No.: PCT/CN2019/100395
§ 371 (c)(1),
(2) Date: Jun. 29, 2020

(87) PCT Pub. No.: WO2021/026770
PCT Pub. Date: Feb. 18, 2021

(65) Prior Publication Data
US 2021/0405816 A1    Dec. 30, 2021

(51) Int. Cl.
*G06F 3/044* (2006.01)
(52) U.S. Cl.
CPC .......... *G06F 3/0446* (2019.05); *G06F 3/0443* (2019.05); *G06F 2203/04102* (2013.01);
(Continued)

(58) Field of Classification Search
None
See application file for complete search history.

(56) References Cited

U.S. PATENT DOCUMENTS 9,152,267 B2 * 10/2015 Seo ................ G06F 3/0443
9,952,730 B2    4/2018 Song
(Continued)

FOREIGN PATENT DOCUMENTS

| CN | 104346011 A | 2/2015 |
|----|-------------|--------|
| CN | 104932764 A | 9/2015 |
| CN | 106489124 A | 3/2017 |

OTHER PUBLICATIONS

International Search Report of PCT/CN2019/100395 in Chinese, dated Apr. 28, 2020.
(Continued)

*Primary Examiner* — Duane N Taylor, Jr.
(74) *Attorney, Agent, or Firm* — Collard & Roe, P.C.

(57) ABSTRACT

A touch panel, a manufacturing method thereof, and an electronic device are provided. The touch panel includes a main body region and a bending region, and the bending region is an region in which the main body region extends along a first direction, and bends relative to the main body region; the main body region includes a first touch region; the bending region comprises a second touch region; and a distribution density of touch sensors in the second touch region along the bending direction of the bending region is higher than a distribution density of touch sensors in the first touch region along the first direction. The touch panel can effectively compensate the influence of bending on the touch signal amount and effectively improve the touch performance of the touch region located in the bending region.

13 Claims, 10 Drawing Sheets

(52) U.S. Cl.
CPC .............. *G06F 2203/04103* (2013.01); *G06F 2203/04111* (2013.01); *G06F 2203/04112* (2013.01)

(56) References Cited

U.S. PATENT DOCUMENTS

2017/0147114 A1   5/2017   Dong et al.
2017/0205957 A1   7/2017   Park et al.

OTHER PUBLICATIONS

Notice of Transmittal of the International Search Report of PCT/CN2019/100395 in Chinese, dated Apr. 28, 2020.
Written Opinion of the International Searching Authority of PCT/CN2019/100395 in Chinese, dated Apr. 28, 2020.
International Search Report of PCT/CN2019/100395 in Chinese, dated Apr. 28, 2020 with English Translation.
Extended European Search Report dated Jul. 1, 2022 in European Patent Application No. 19941005.1.

\* cited by examiner

TOUCH PANEL, MANUFACTURING METHOD THEREOF, AND ELECTRONIC DEVICE

CROSS REFERENCE TO RELATED APPLICATIONS

This application is the National Stage of PCT/CN2019/100395 filed on Aug. 13, 2019, the disclosure of which is incorporated by reference.

TECHNICAL FIELD

Embodiments of the present disclosure relate to a touch panel, a manufacturing method thereof, and an electronic device.

BACKGROUND

User interface with touch function is widely used in various electronic devices, and with the development of flexible electronics technology, flexible touch panel technology has also attracted the attention of the industry.

SUMMARY

At least one embodiment of the present disclosure provides a touch panel, wherein the touch panel comprises a main body region and a bending region, wherein the bending region is a region which extends from the main body region along a first direction, and bends relative to the main body region, the main body region comprises a first touch region, the bending region comprises a second touch region, and a distribution density of touch sensors in the second touch region along a bending direction of the bending region is higher than a distribution density of touch sensors in the first touch region along the first direction.

In some examples, the first touch region comprises a plurality of first main touch electrodes extending along the first direction and a plurality of second main touch electrodes extending along a second direction, the second direction is orthogonal to the first direction, and the plurality of first main touch electrodes and the plurality of second main touch electrodes cross each other to form the touch sensors in the first touch region; and the second touch region comprises a plurality of first auxiliary touch electrodes extending along the first direction and a plurality of second auxiliary touch electrodes extending along the bending direction, and the plurality of first auxiliary touch electrodes and the plurality of second auxiliary touch electrodes cross each other to form the touch sensors in the second touch region.

In some examples, a distribution density of the plurality of second auxiliary touch electrodes along the bending direction is higher than a distribution density of the plurality of second main touch electrodes along the first direction.

In some examples, a center distance between adjacent second main touch electrodes is greater than a center distance between adjacent second auxiliary touch electrodes.

In some examples, the center distance between the adjacent second auxiliary touch electrodes is ¼-¾ of the center distance between the adjacent second main touch electrodes.

In some examples, an average size of the plurality of second main touch electrode portions along the first direction is larger than an average size of the plurality of second auxiliary touch electrode portions along the bending direction.

In some examples, the average size of the plurality of second auxiliary touch electrode portions along the bending direction is ¼-¾ of the average size of the plurality of second main touch electrode portions along the first direction.

In some examples, the bending region further comprises a third touch region, a curvature of the third touch region is greater than a curvature of the second touch region, and along the bending direction, a distribution density of touch sensors in the third touch region is higher than the distribution density of the touch sensors in the second touch region.

In some examples, each first auxiliary touch electrode of the plurality of first auxiliary touch electrodes comprises a plurality of first auxiliary touch electrode portions and a plurality of first auxiliary connection portions which are alternately distributed along the first direction, and each second auxiliary touch electrode of the plurality of second auxiliary touch electrodes comprises a plurality of second auxiliary touch electrode portions and a plurality of second auxiliary connection portions which are alternately distributed along the bending direction; adjacent first auxiliary touch electrode portions are electrically connected to a first auxiliary connection portion between the adjacent first auxiliary touch electrode portions through a first auxiliary connection bridge, respectively, to be connected to each other, and adjacent second auxiliary touch electrode portions are electrically connected to a second auxiliary connection portion between the adjacent second auxiliary touch electrode portions through a second auxiliary connection bridge, respectively, to be connected to each other; and the plurality of first auxiliary connection portions and the plurality of second auxiliary connection portions are respectively located at a plurality of intersections of the first auxiliary touch electrode and the second auxiliary touch electrode, each first auxiliary connection portion of the plurality of first auxiliary connection portions has a closed annular structure, each second auxiliary connection portion of the plurality of the second auxiliary connection portions is located within the annular structure and insulated from the first auxiliary connection portion, and the plurality of first auxiliary touch electrode portions, the plurality of first auxiliary connection portions, and the plurality of second auxiliary touch electrode portions and the plurality of second auxiliary connection portions are all arranged in a same layer and made of a same material.

In some examples, the first auxiliary connection bridge and the second auxiliary connection bridge are arranged in a same layer and made of a same material, and are located on different layers from the first auxiliary connection portion and the second auxiliary connection portion, and a conductivity of the first auxiliary connection bridge and the second auxiliary connection bridge is higher than a conductivity of the first auxiliary connection portion and the second auxiliary connection portion.

In some examples, the first auxiliary touch electrode and the second auxiliary touch electrode comprise a transparent conductive material or a metal grid pattern.

At least one embodiment of the present disclosure also provides an electronic device including the touch panel of the above embodiments.

At least one embodiment of the present disclosure also provides a manufacturing method for manufacturing a touch panel, the touch panel comprises a main body region and a bending region, the bending region is a region which extends from the main body region along a first direction, and bends relative to the main body region, the main body region comprises a first touch region, the bending region comprises a second touch region, and the manufacturing method comprising forming a plurality of touch sensors in the first touch region and a plurality of touch sensors in the second touch region respectively, and a distribution density of the plurality of touch sensors in the second touch region along a bending direction of the bending region is higher than a distribution density of the plurality of touch sensors in the first touch region along the first direction.

In some examples, forming the plurality of touch sensors in the first touch region and the plurality of touch sensors in the second touch region respectively comprises: forming a plurality of first main touch electrodes extending along the first direction and a plurality of second main touch electrodes extending along a second direction in the first touch region to form the plurality of touch sensors in the first touch region at intersections of the plurality of first main touch electrodes and the plurality of second main touch electrodes, and the second direction being orthogonal to the first direction; and forming a plurality of first auxiliary touch electrodes extending along the first direction and a plurality of second auxiliary touch electrodes extending along the second direction in the second touch region to form the plurality of touch sensors in the second touch region at intersections of the plurality of first auxiliary touch electrodes and the plurality of second auxiliary touch electrodes.

In some examples, along the first direction, a distribution density of the plurality of second auxiliary touch electrodes is higher than a distribution density of the plurality of second main touch electrodes.

In some examples, a center distance between adjacent second main touch electrodes is greater than a center distance between adjacent second auxiliary touch electrodes.

In some examples, the center distance between the adjacent second auxiliary touch electrodes is ¼-¾ of the center distance between the adjacent second main touch electrodes.

In some examples, along the first direction, an average size of the plurality of second main touch electrodes is larger than an average size of the plurality of second auxiliary touch electrodes.

In some examples, along the first direction, the average size of the plurality of second auxiliary touch electrodes is ¼-¾ of the average size of the plurality of second main touch electrodes.

In some examples, forming the plurality of first auxiliary touch electrodes comprises: forming a plurality of first auxiliary touch electrode portions and a plurality of first auxiliary connection portions which are alternately distributed along the first direction, forming the plurality of second auxiliary touch electrodes comprises: forming a plurality of second auxiliary touch electrode portions and a plurality of second auxiliary connection portions which are alternately distributed along the second direction, adjacent first auxiliary touch electrode portions are electrically connected to a first auxiliary connection portion formed between the adjacent first auxiliary touch electrode portions through a first auxiliary connection bridge, respectively, to be connected to each other, and adjacent second auxiliary touch electrode portions are electrically connected to a second auxiliary connection portion formed between the adjacent second auxiliary touch electrode portions through a second auxiliary connection bridge, respectively, to be connected to each other; the plurality of first auxiliary connection portions and the plurality of second auxiliary connection portions are respectively formed at a plurality of intersections of the first auxiliary touch electrode and the second auxiliary touch electrode; and each of the plurality of the first auxiliary connection portion has a closed annular structure, each of the plurality of the second auxiliary connection portion is formed within the annular structure and insulated from the first auxiliary connection portion, and the plurality of first auxiliary touch electrode portions, the plurality of first auxiliary connection portions, the plurality of second auxiliary touch electrode portions and the plurality of second auxiliary connection portions are formed in a same patterning process.

In some examples, manufacturing method further comprises: bending the second touch region relative to the first touch region along the bending direction to form the bending region.

BRIEF DESCRIPTION OF THE DRAWINGS

In order to clearly illustrate the technical solutions of the embodiments of the present disclosure, the drawings of the embodiments will be briefly described hereinafter. It is obvious that the described drawings are only related to some embodiments of the present disclosure and are not limitative to the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a portion but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

Figure 1A:
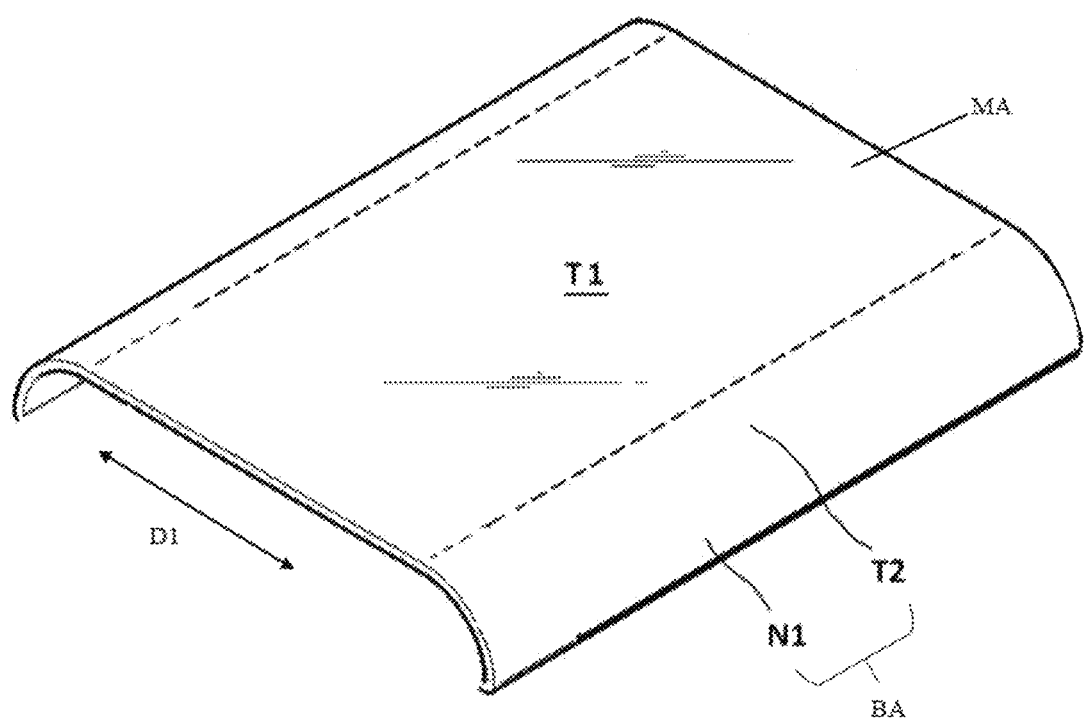
FIG. 1A is a perspective diagram of a touch panel.

FIG. 1A is a perspective diagram of a flexible touch panel, which can be applied to electronic devices, such as mobile phones, tablet computers, etc. As shown in the figure, the touch panel comprises a main body region MA and a bending region BA, and the bending region BA is a region which extends from the main body region MA along a first direction D1, and bends relative to the main body region MA. For example, the main body region MA and the bending region BA are continuous in the touch panel, and a boundary line B between the main body region MA and the bending region BA is schematically shown in FIG. 1A. However, there may be no actual boundary between the main body region MA and the bending region BA. The main body region MA is generally planar and includes a first touch region T1, for example, a main touch region of the touch panel. The bending region BA includes, for example, a second touch region T2 and a non-touch region N1.

For example, the bending region BA may be distributed on a left side and a right side, or an upper side and a lower side, or only on one side of the rectangular main body region MA.

For example, a width of the main body region MA ranges from 50 mm to 65 mm, and a width of each bending region BA ranges from 10-15 mm.

In another embodiment, the touch panel may include, for example, two main body regions and a bending region located between the two main body regions, for example, the bending region is located in a middle of the touch panel, and the two main body regions are located in different planes.

Figure 1B:
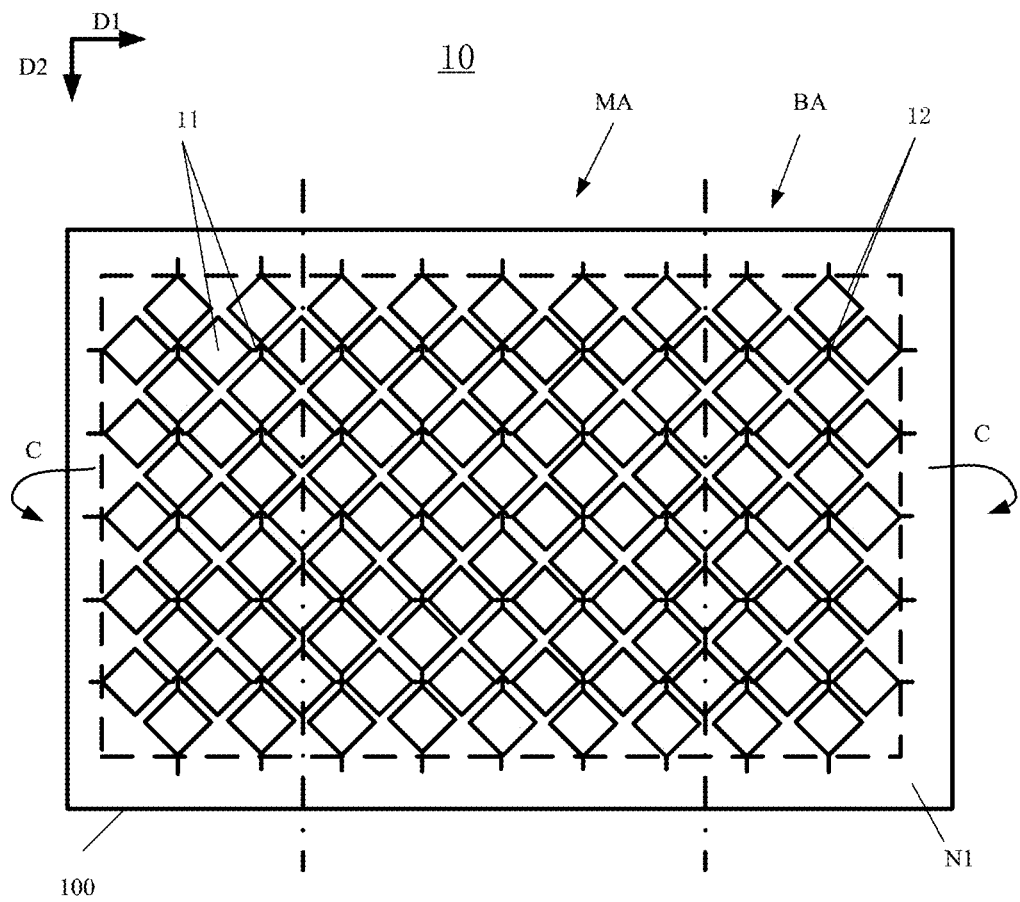
FIG. 1B is a schematic plan diagram of a touch panel in an unfolded state.

FIG. 1B is a schematic plan diagram of the touch panel as shown in FIG. 1A in an unfolded state. For example, the touch panel is a mutual capacitance type touch panel, and a touch sensor is formed by mutual capacitance between touch electrodes to realize a touch function. As shown in FIG. 1B, the touch panel 10 includes a substrate 100, and a plurality of first touch electrodes 11 and a plurality of second touch electrodes 12 disposed on the substrate 100. A first touch electrode 11 extends in a first direction D1 (e.g., a length direction of the rectangular touch panel in the figure), and the second touch electrode 12 extends in a second direction D2 (e.g., a width direction of the rectangular touch panel in the figure) and extends from the main body region MA to the bending region BA. The first direction D1 and the second direction D2 cross each other, for example, orthogonally.

The touch panel is bent according to the bending direction C indicated by an arrow in the figure to obtain a shape as shown in FIG. 1A.

Figure 1C:
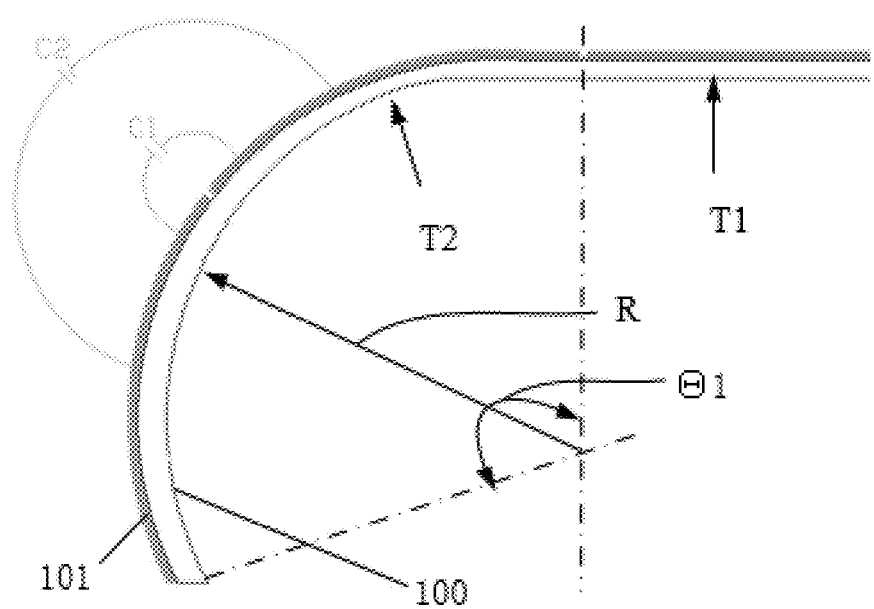
FIG. 1C is a cross-sectional diagram of the touch panel as shown in FIG. 1B in a bending state.

A plurality of touch sensors are formed between adjacent first touch electrodes 11 and second touch electrodes 12. FIG. 1C is a cross-sectional diagram of the touch panel along the first direction D1 in the state as shown in FIG. 1A. FIG. 1C schematically shows touch sensors C1 and C2 formed between the adjacent first touch electrodes 11 and second touch electrodes 12 in the bending region BA along the bending direction C of the bending region BA.

Figure 2:
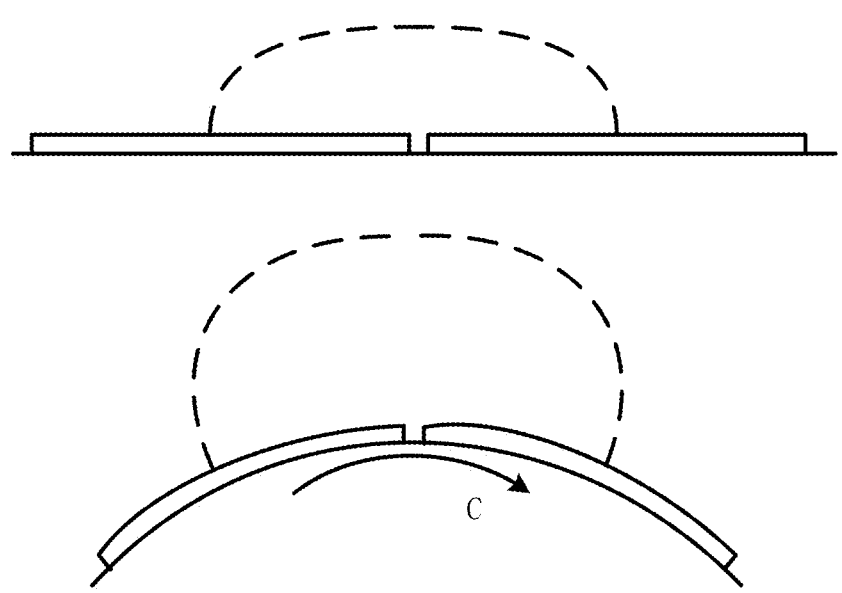
FIG. 2 shows a comparison diagram of a touch sensor formed by a touch electrode in an unfolded state and a touch sensor formed by a touch electrode in a bending state.

FIG. 2 schematically shows a comparison diagram of a touch sensor formed by a touch electrode in an unfolded state (planar state) and a touch sensor formed by a touch electrode in a bending state. Inventors found that when the touch electrodes are in the bending state, a power line between the touch electrodes forming mutual capacitance are elongated along the bending direction C, i.e., an equivalent spacing between the touch electrodes is elongated, so a capacitance value of the mutual capacitance becomes smaller. For example, in the situation as shown in FIG. 1C, almost half of the touch electrodes in the bending region have been completely bent to a vertical direction, and the capacitance is difficult to formed by the touch electrodes in this portion with the adjacent touch electrodes, thus causing a signal amount induced by the touch region in the bending region to be reduced by at least half compared with the main body region, greatly affecting the touch sensitivity of the touch panel in the bending region.

The embodiment of the present disclosure provides a touch panel. A distribution density of touch sensors in the touch region of the bending region along the bending direction of the bending region is higher than a distribution density of touch sensors in the touch region of the non-bending region (i.e., the above-mentioned main body region) in the first direction corresponding to the bending direction. By arranging touch sensors with higher distribution density in the touch region corresponding to the bending region, the influence of bending on the touch signal amount is compensated, and the touch performance of the touch region of the bending region is effectively improved.

Figure 3A:
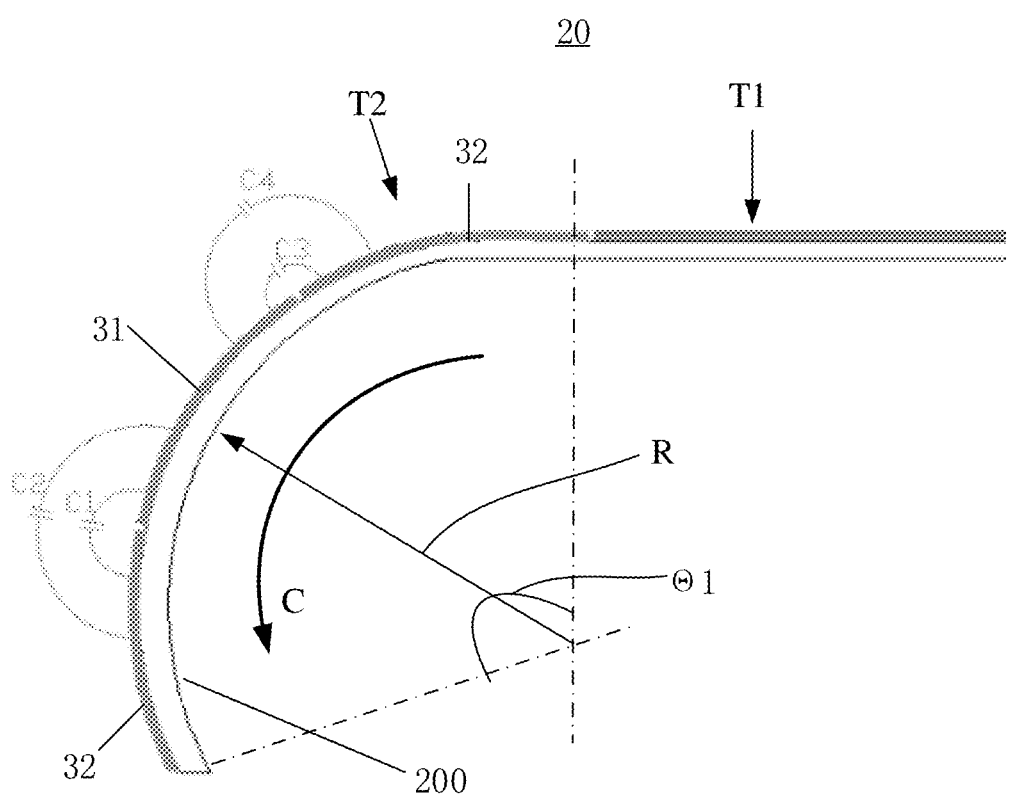
FIG. 3A is a cross-sectional diagram of a touch panel provided by some embodiments of the present disclosure.
Figure 3B:
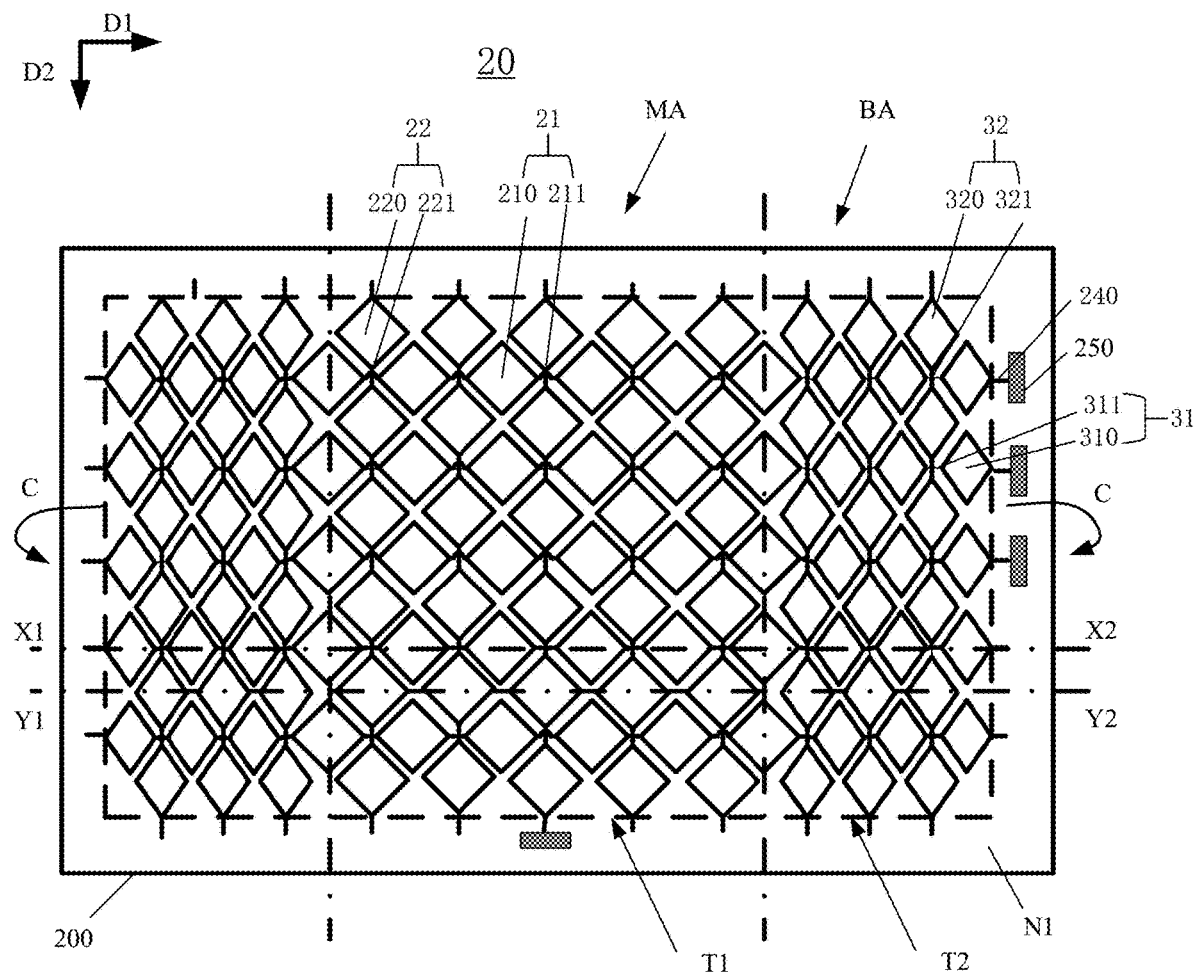
FIG. 3B is a schematic plan diagram of a touch panel in an unfolded state provided by some embodiments of the present disclosure.

FIG. 3A is a cross-sectional diagram of a touch panel provided by some embodiments of the present disclosure along the first direction D1 in the state as shown in FIG. 1A, and FIG. 3B is a schematic diagram of a touch panel provided by some embodiments of the present disclosure in an unfolded state (planar state).

As shown in FIG. 3B, the touch panel 20 includes a main body region MA and a bending region BA, and the main body region MA includes a first touch region T1, the bending region BA includes a second touch region T2. A shape as shown in FIGS. 1A and 3A is obtained by bending the touch panel as shown in FIG. 3B in the bending direction C shown by an arrow in the figure.

As shown in FIG. 3A, a surface normal of the bending region BA and a surface normal of the main body region MA face different directions, and the bending region BA is formed as a curved surface. For example, a cross-sectional shape of the bending region BA is arc-shaped, and may be a portion of a circumference, for example. For example, as shown in FIG. 3A, the bending region BA is formed to have a cross-sectional shape which is a portion of a circumference having a predetermined curvature radius R, for example, a center angle θ1 ranges from 70° to 120°. For example, the touch panel can obtain better grip and visual perception by selecting appropriate value of R and value of 01. For example, the curvature radius R of the bending region BA ranges from 3-4 mm.

Figure 4:
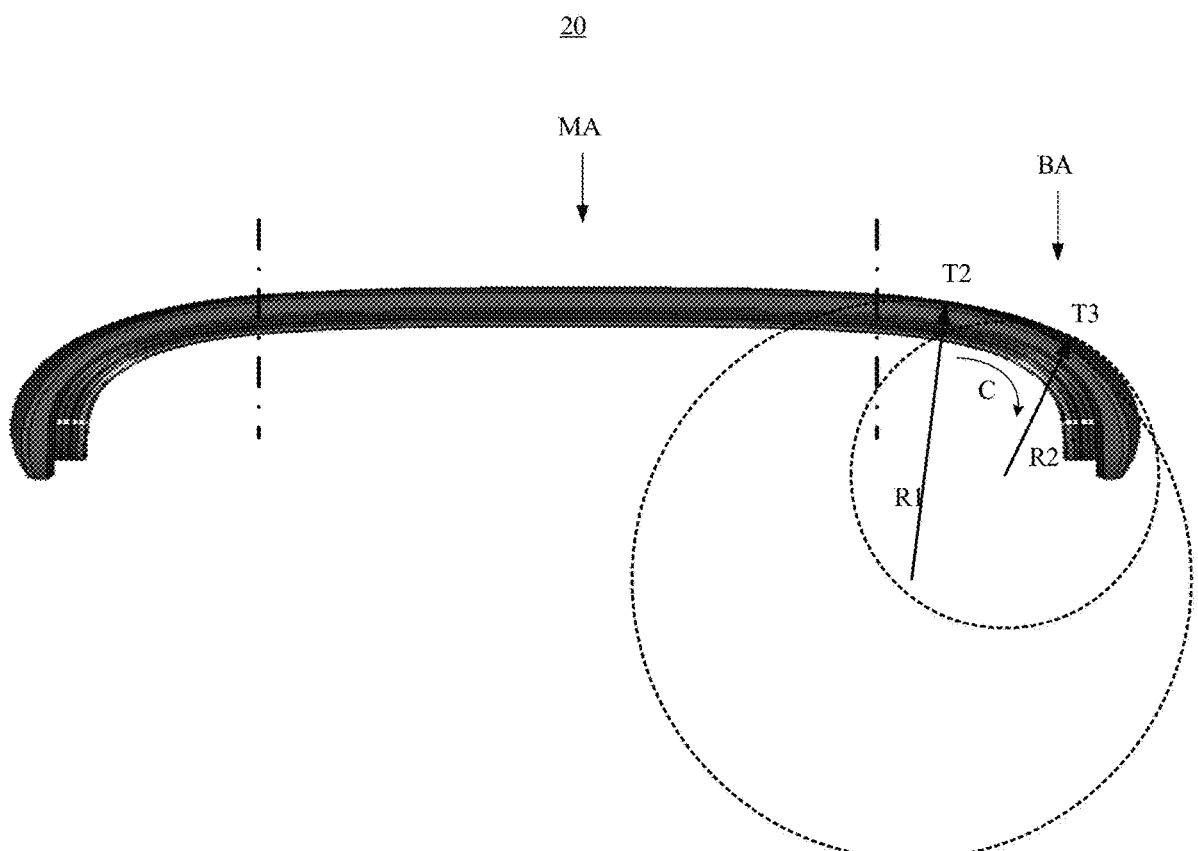
FIG. 4 is a schematic diagram of a touch panel provided by other embodiments of the present disclosure.

In other examples, as shown in FIG. 4, the bending region BA may also include a plurality of bending regions with different curvatures. For example, along the bending direction C of the bending region, a curvature of the bending region gradually changes, for example, gradually increases, gradually decreases, increases first and then decreases, decreases first and then increases, etc. For example, the cross-sectional shape of the bending region may be portion of an ellipse. The embodiment of the present disclosure is not limited to the specific shape of the bending region BA.

As shown in FIG. 3B, the first touch region T1 includes a plurality of first main touch electrodes 21 extending in the first direction D1 (e.g., the length direction of the rectangular touch panel in the figure) and a plurality of second main touch electrodes 22 extending in the second direction D2 (e.g., the width direction of the rectangular touch panel in the figure), and a plurality of touch sensors are formed between the plurality of first main touch electrodes 21 and the plurality of second main touch electrodes 22. For example, a first main touch electrode 21 and a second main touch electrode 22 form a touch sensor at a portion overlapping each other in a direction perpendicular to the substrate 200, and a touch sensor may also be formed between adjacent first main touch electrode 21 and second main touch electrode 22.

Referring to FIGS. 3A and 3B, the second touch region T2 includes a plurality of first auxiliary touch electrodes 31 extending along the bending direction C of the bending region BA and a plurality of second auxiliary touch electrodes 32 extending along the second direction D2. The plurality of first auxiliary touch electrodes 31 and the plurality of second auxiliary touch electrodes 32 cross each other to form touch sensors in the second touch region T2. For example, a first auxiliary touch electrode 31 and the plurality of second auxiliary touch electrodes 32 overlap with each other in a direction perpendicular to the substrate 200 to form the touch sensors, and the touch sensors may also be formed between adjacent first auxiliary touch electrodes 31 and between the plurality of second auxiliary touch electrodes 32. A distribution density of the touch sensors in the second touch region T2 along the bending direction C (i.e., an amount of touch sensors per unit region) is higher than a distribution density of the touch sensors in the first touch region T1 along the first direction D1. For example, an amount of touch sensors formed in a unit region of a first auxiliary touch electrode 31 extending along the bending direction C in the second touch region T2 is larger than an amount of touch sensors formed in a unit region of a first main touch electrode 21 extending along the first direction D1 in the first touch region T1.

For example, as shown in FIG. 3B, along the first direction D1, a distribution density of the first auxiliary touch electrode 32 is higher than a distribution density of the first main touch electrode 22. For example, along the first direction D1, a center distance between adjacent second auxiliary touch electrodes 32 is less than a center distance between adjacent second main touch electrodes 22, and an average size of the second main touch electrode 22 is larger than an average size of the second auxiliary touch electrode 32. For example, the center distance between the adjacent second auxiliary touch electrodes 32 is ¼-¾ of the center distance between the adjacent second main touch electrodes 22. For example, along the first direction D1, the average size of the second auxiliary touch electrode 32 is ¼-¾ of the average size of the second main touch electrode 22.

In this way, the amount of second auxiliary touch electrodes 32 is larger than the amount of second main touch electrodes 22 in regions of a same area, so that more touch sensors can be formed between the second auxiliary touch electrodes 32 and the first auxiliary touch electrodes 31 (for example, more touch sensors are formed in a unit region between the second auxiliary touch electrodes 32 and the same first auxiliary touch electrode 31), so that the density of the touch sensors in the second touch region T2 is higher than the density of the touch sensors in the first touch region T1 in the corresponding direction.

For example, along the second direction D2, the distribution density of the touch sensors in the second touch region T2 is the same as the distribution density of the touch sensors in the first touch region T1. For example, as shown in FIG. 3B, the center distance between the adjacent first auxiliary touch electrodes 31 is the same as the center distance between the adjacent first main touch electrodes 21.

FIG. 3A schematically shows a plurality of touch sensors C1, C2, C3 and C4 formed between a first auxiliary touch electrode 31 and second auxiliary touch electrodes 32, which are adjacent to each other, in the bending region BA. Referring to FIG. 1C, as the amount of second auxiliary touch electrodes 32 increases, the amount of touch sensors formed between the first auxiliary touch electrodes 31 and second auxiliary touch electrodes 32, which are adjacent to each other, also increases, thus improving the touch sensitivity in the second touch region T2.

For example, as shown in FIG. 3B, the first main touch electrode 21 includes first main touch electrode portions 210 and first main connection portions 211 that are alternately connected, and the second main touch electrode 22 includes second main touch electrode portions 220 and second main connection portions 221 that are alternately connected. A first main connection portion 211 and a second main connection portion 221 overlap each other in a direction perpendicular to a board surface of the substrate 200 to form a touch sensor, and a touch sensor is also formed between the first main touch electrode portion 210 and the second main touch electrode portion 220 which are adjacent to each other. The first auxiliary touch electrode 31 includes a first auxiliary touch electrode portion 310 and a first auxiliary connection portion 311 that are alternately connected, and the second auxiliary touch electrode 32 includes a second auxiliary touch electrode portion 320 and a second auxiliary connection portion 321 that are alternately connected. A first auxiliary connection portion 311 and a second auxiliary connection portion 321 overlap with each other in a direction perpendicular to the board surface of the substrate 200 to form a touch sensor, and a touch sensor is also formed between the first auxiliary touch electrode portion 310 and the second auxiliary touch electrode portion 320 which are adjacent to each other.

For example, the first main touch electrode portion 210, the second main touch electrode portion 220, the first auxiliary touch electrode portion 310, the second auxiliary touch electrode portion 320, the first main connection portion 211 and the first auxiliary connection portion 311 are arranged in a same layer and made of a same material, and the second main connection portion 221 and the second auxiliary connection portion 321 are arranged in a same layer and made of a same material, that is, the second main connection portion 221 and the second auxiliary connection portion 321 respectively serve as bridging portions of the first touch region T1 and the second touch region T2; or the first main touch electrode portion 210, the second main touch electrode portion 220, the first auxiliary touch electrode portion 310, the second auxiliary touch electrode portion 320, the second main connection portion 221 and the second auxiliary connection portion 321 are arranged in a same layer and made of a same material, and the first main connection portion 211 and the first auxiliary connection portion 311 are arranged in a same layer and made of a same material, that is, the first main connection portion 211 and the first auxiliary connection portion 311 serve as bridging portions of the first touch region T1 and the second touch region T2 respectively.

For example, the first main touch electrode 21, the second main touch electrode 22, the first auxiliary touch electrode 31, and the second auxiliary touch electrode 32 adopts a transparent conductive material. For example, the transparent conductive material may be a transparent conductive metal oxide material, such as indium tin oxide (ITO), indium zinc oxide (IZO), zinc oxide (ZnO), aluminum zinc oxide (AZO), indium gallium zinc oxide (IGZO), and the like. In other examples, the first main touch electrode 21, the second main touch electrode 22, the first auxiliary touch electrode 31, and the second auxiliary touch electrode 32 may also be of a Metal Mesh structure, for example, a material of the metal mesh may be gold (Au), silver (Ag), copper (Cu), aluminum (Al), molybdenum (Mo), magnesium (Mg), tungsten (W), or an alloy material of more metals.

For example, as shown in FIG. 3B, along the first direction D1, the center distance between the adjacent second main touch electrode portions 220 is greater than the center distance between the adjacent second auxiliary touch electrode portions 320. For example, along the first direction D1, a size of the second main touch electrode portion 220 is larger than a size of the second auxiliary touch electrode portion 320. For example, along the first direction D1, the size of the second auxiliary touch electrode portion 320 is ¼-¾ of the size of the second main touch electrode portion 220. In some examples, a width of the second main touch electrode portion 220 in the first direction D1 ranges from 4 mm to 5 mm, and a width of the second auxiliary touch electrode portion 320 in the first direction D1 ranges from 1.5 mm to 3 mm.

In some examples, the first touch region T1 are 12-18 columns of second main touch electrodes 22; the second touch region T2 includes 2-5 columns of second auxiliary touch electrodes 32.

For example, as shown in FIG. 3B, along the bending direction C, a center distance between adjacent first auxiliary touch electrode portions 310 in the first auxiliary touch electrodes 31 is also reduced compared with the center distance of the adjacent first main touch electrode portions 210 in the first main touch electrodes 21. Along the first direction D1, a size of the first auxiliary touch electrode portion 310 is less than a size of the first main touch electrode portion 210.

For example, as shown in FIG. 3B, a bonding pad 250 is provided in the non-touch region N1 for bonding with a touch integrated circuit (e.g., a touch chip, not shown). Each of the first main touch electrode 11, the second main touch electrode 22, the first auxiliary touch electrode 31, and the second auxiliary touch electrode 32 is connected to the corresponding bonding pad 150 through a trace 240, thereby realizing signal transmission between the touch panel 20 and the touch integrated circuit. For example, the touch integrated circuit is a touch chip that provides touch drive signals to the touch panel 20 and receives and processes touch sensing signals output by the touch panel 20 to realize a touch sensing function.

For example, as shown in FIG. 3B, a plurality of first main touch electrodes 21 and a plurality of first auxiliary touch electrodes 31 are electrically connected in one-to-one correspondence and are connected to the bonding pad 250 through traces 240. In this embodiment, the first touch region T1 and the second touch region T2 are uniformly driven; and in other embodiments, the first touch region T1 and the second touch region T2 may be driven respectively, that is, the plurality of first main touch electrodes 21 and the plurality of first auxiliary touch electrodes 31 may be independent of each other and connected to the touch integrated circuit respectively.

In other embodiments, the bending region BA may include a plurality of regions with different curvatures, that is, the bending region may not be portion of a circumference or may be portion of an ellipse. Touch regions can be respectively arranged in a plurality of regions with different curvatures, and touch sensors with different densities can be arranged according to the curvatures corresponding to the touch regions in order to compensate for the influence of bending on the touch signal amount.

As mentioned above, FIG. 4 shows a schematic diagram of a touch panel provided by other embodiments of the present disclosure. As shown in FIG. 4, the bending region BA of the touch panel 20 further includes a third touch region T3, a curvature radius R2 of the third touch region T3 is less than the curvature radius R1 of the second touch region T2, that is, a curvature of the third touch region T3 is larger than the curvature of the second touch region T2. Along the bending direction C of the bending region BA, a density of touch sensors in the third touch region T3 is higher than the density of touch sensors in the second touch region T2. For example, the third touch region T3 includes a plurality of third auxiliary touch electrodes extending along the bending direction C and a plurality of fourth auxiliary touch electrodes extending along the second direction D2, and a center distance between adjacent fourth auxiliary touch electrodes is less than the center distance of the adjacent second auxiliary touch electrodes.

Figure 5A:
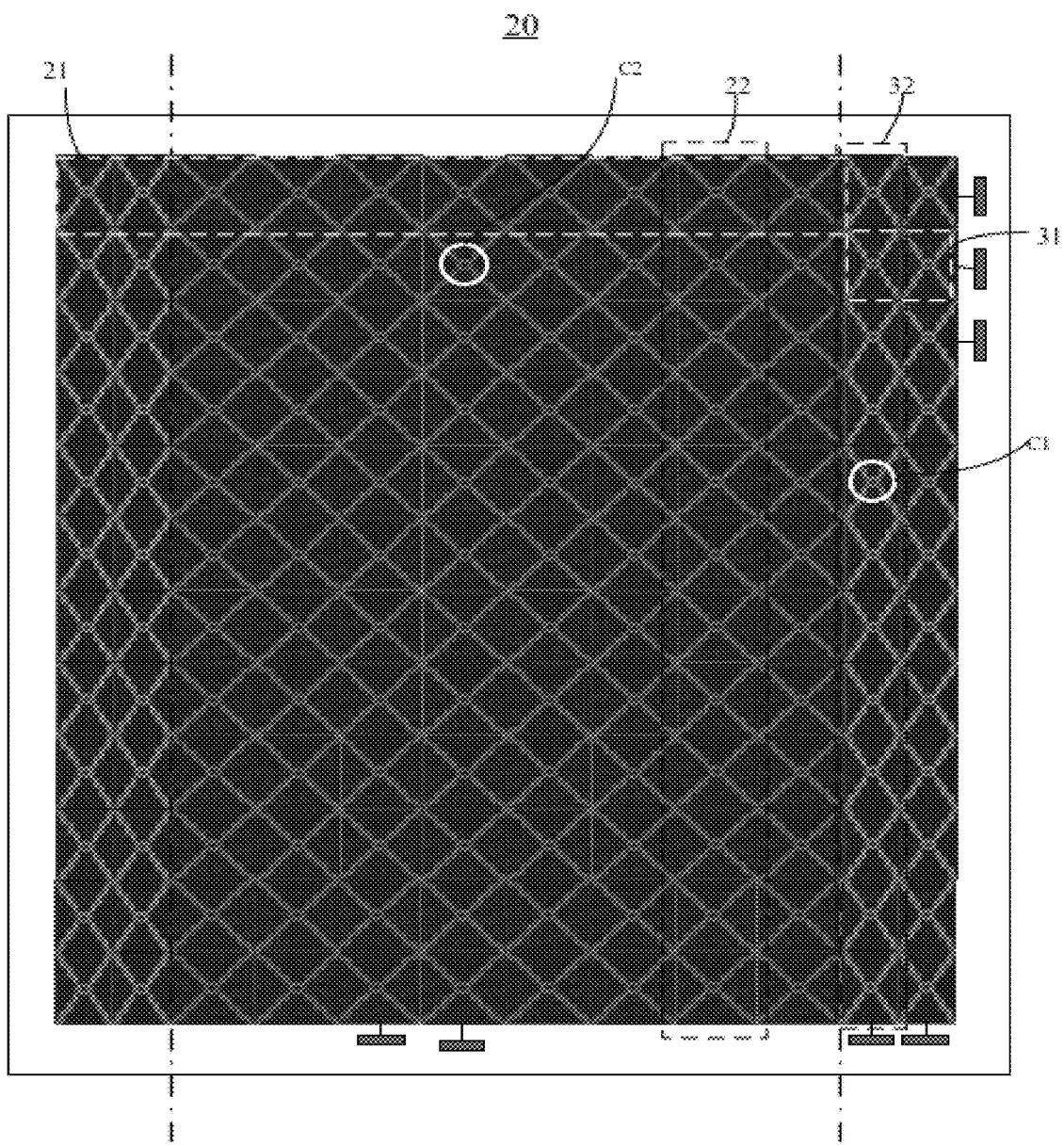
FIG. 5A is a schematic plan diagram of a touch panel in an unfolded state provided by still other embodiments of the present disclosure.
Figure 5B:
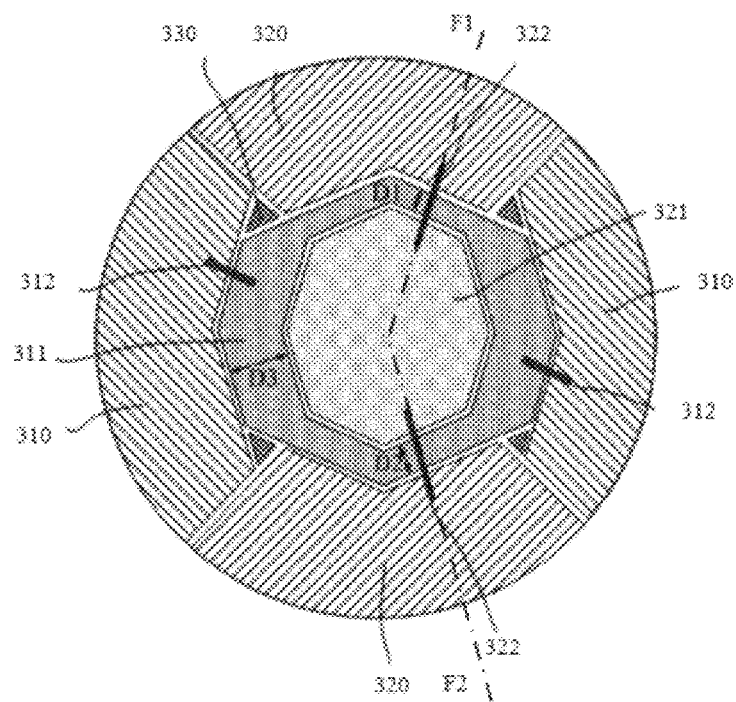
FIG. 5B is an enlarged schematic diagram of a portion of FIG. 5A.
Figure 5C:
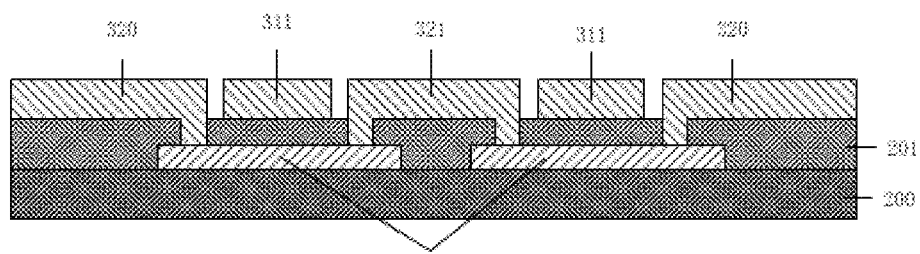
FIG. 5C is a cross-sectional diagram of FIG. 5B taken along a section line F1-F2.

FIG. 5A is a schematic plan diagram of a touch panel provided by still other embodiments of the present disclosure, FIG. 5B is an enlarged schematic diagram of the touch panel as shown in FIG. 5A at an intersection (C1) of the first auxiliary touch electrode 31 and the second auxiliary touch electrode 32, and FIG. 5C is a sectional diagram of FIG. 5B along a section line F1-F2.

Referring to FIGS. 5A, 5B and 5C, the plurality of first auxiliary connection portions 311 and the plurality of second auxiliary connection portions 321 are respectively located at a plurality of intersections of the first auxiliary touch electrode 31 and the second auxiliary touch electrode 32. A first auxiliary connection portion 311 has a closed annular structure, and a second auxiliary connection portion 321 is located within the annular structure and is insulated from the first auxiliary connection portion 311. For example, the plurality of first auxiliary touch electrode portions 310, the plurality of first auxiliary connection portions 311, the plurality of second auxiliary touch electrode portions 320 and the plurality of second auxiliary connection portions 321 are all arranged in a same layer and made of a same material.

As shown in FIG. 5B, the first auxiliary touch electrode 31 further includes a first auxiliary connection bridge 312, and adjacent first auxiliary touch electrode portions 310 are electrically connected to each other through the first auxiliary connection bridge 312 and a first auxiliary connection portion 311 located between the adjacent first auxiliary touch electrode portions 310, respectively. The second auxiliary touch electrode 32 further includes a second auxiliary connection bridge 322, and adjacent second auxiliary touch electrode portions 320 are electrically connected to each other through the second auxiliary connection bridge 322 and a second auxiliary connection portion 321 located between the adjacent second auxiliary touch electrode portions 320, respectively.

For example, as shown in FIG. 5B, the second auxiliary connection bridge 322 electrically connects the second auxiliary touch electrode 320 and the second auxiliary connection portion 321 across a portion of the first auxiliary connection portion 311, and the first auxiliary connection bridge 312 electrically connects the first auxiliary touch electrode 310 and the first auxiliary connection portion 311 which are adjacent to each other.

For example, the first auxiliary connection bridge 312 and the second auxiliary connection bridge 322 are arranged in a same layer and made of a same material, and are located on different layers from the first auxiliary connection portion 311 and the second auxiliary connection portion 321. For example, as shown in FIG. 5C, an insulating layer 201 is interposed between the second auxiliary connection bridge 322 and the first auxiliary connection portion 311.

For example, a conductivity of the first auxiliary connection bridge 312 and the second auxiliary connection bridge 322 is higher than a conductivity of the first auxiliary connection portion 311 and the second auxiliary connection portion 321.

For example, materials of the first auxiliary connection bridge 312 and the second auxiliary connection bridge 322 are metal materials, for example, gold (Au), silver (Ag), copper (Cu), aluminum (Al), molybdenum (Mo), magnesium (Mg), tungsten (W) or alloy materials of the above metals of. For example, the materials of the first auxiliary touch electrode portion 310, the first auxiliary connection portion 311, the second auxiliary touch electrode portion 320, and the second auxiliary connection portion 321 are transparent conductive materials, which may be transparent conductive metal oxide materials, such as indium tin oxide (ITO), indium zinc oxide (IZO), zinc oxide (ZnO), aluminum zinc oxide (AZO), indium gallium zinc oxide (IGZO), and the like.

For example, as shown in FIG. 5B, a width of a portion of the first auxiliary connecting portion 311 facing the second auxiliary connecting bridge 322 is less than a width of a widest portion of the first auxiliary connecting portion 311. For example, widths D1 and D2 of portions of the first auxiliary connection portion 311 spanned by the second auxiliary connection bridge 322 are less than the width D3 of the widest portion of the auxiliary connection portion 311, so that a length of the second auxiliary connection bridge 322 can be made small, and the influence of the second auxiliary connection bridge 322 on the display of the display device can be reduced when the touch panel 20 is integrated with the display device.

For example, a gap between the adjacent first auxiliary touch electrode 310 and the second auxiliary touch electrode 320 may be provided with a filling portion 330 for filling the gap, so as to avoid the defect of poor color difference of the appearance of the touch screen due to excessive gap.

Similarly, in the first touch region T1, the intersection (C2) of the first main touch electrode 21 and the second main touch electrode 22 can also be set as described above, the description will not be repeated here.

Figure 6:
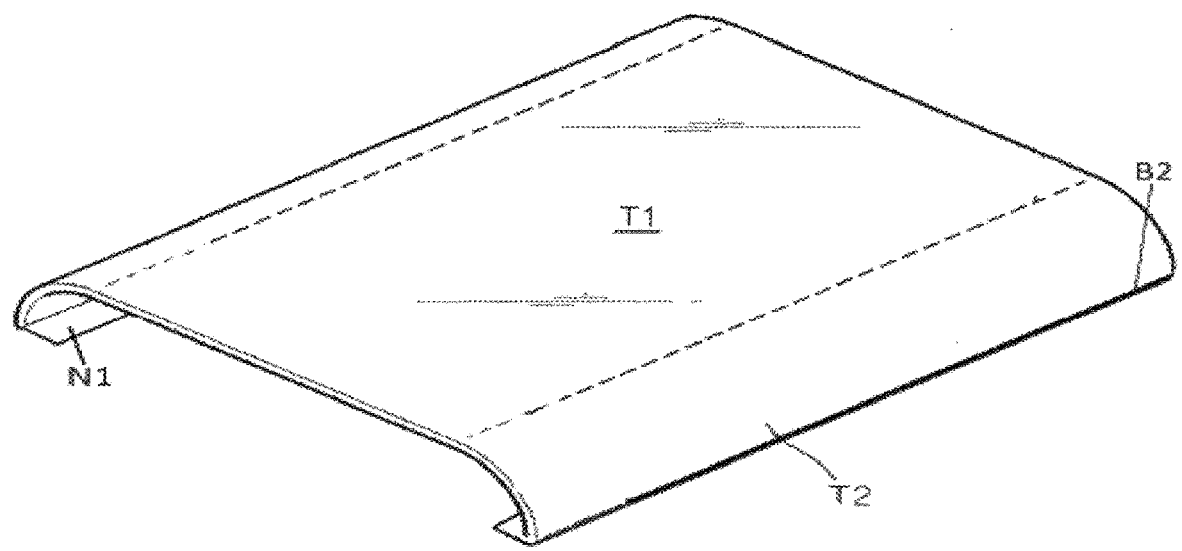
FIG. 6 is a schematic diagram of a touch panel according to still other embodiments of the present disclosure.

FIG. 6 is a perspective diagram of a touch panel provided by other embodiments of the present disclosure. In this example, the non-touch region N1 is bent to a back surface of the touch panel 200 with respect to the second touch region T2. FIG. 6 shows a boundary B2 between the non-touch region N and the second touch region T2, however, there may be no actual boundary between the non-touch region N and the second touch region T2. For example, the non-touch region N1 is parallel to the first touch region T1. This structure can realize a touch panel structure with a narrow frame or even no frame without reducing the wiring region of the non-touch region N1.

The embodiment of the present disclosure also provides an electronic device including the touch panel 20. For example, the electronic device is a touch display panel and also includes a display panel. The touch panel and the display panel are integrated in various ways, such as embedded type, external type, etc.

Figure 7A:
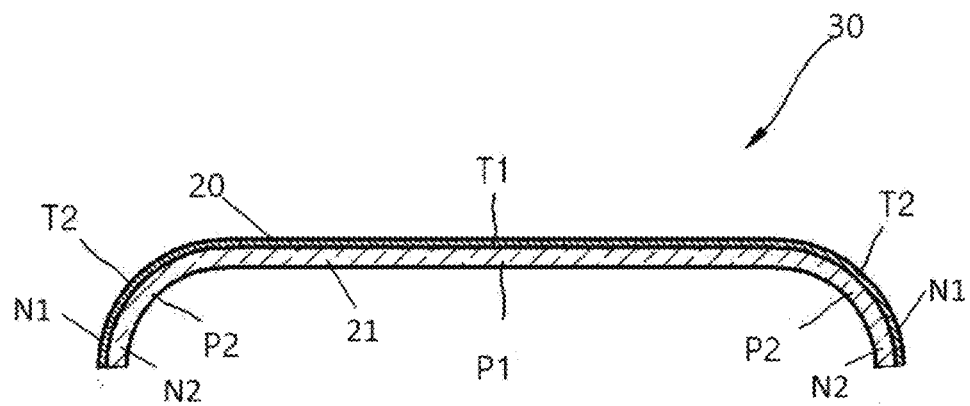
FIG. 7A is a schematic diagram of an electronic device provided by some embodiments of the present disclosure.

FIG. 7A is a cross-sectional diagram of an electronic device according to an embodiment of the present disclosure. For example, the electronic device is a touch display panel 30. The touch display panel 30 further includes a display panel 21, which is arranged in a stacked manner with the touch panel 20. The display panel 21 includes a first display region P1, a second display region P2, and a non-display region N2. The first display region P1 and the first touch region N1 are aligned to correspond to each other, the second display region P2 and a second touch region T2 are aligned to correspond to each other, and the non-display region N2 and the non-touch region T2 are aligned to correspond to each other. The display panel 21 and the touch panel 20 are fixed to each other, for example, by adhesive, or formed integrally, that is, the touch panel 20 is directly formed on the display panel 21 and serves as a base substrate.

Figure 7B:
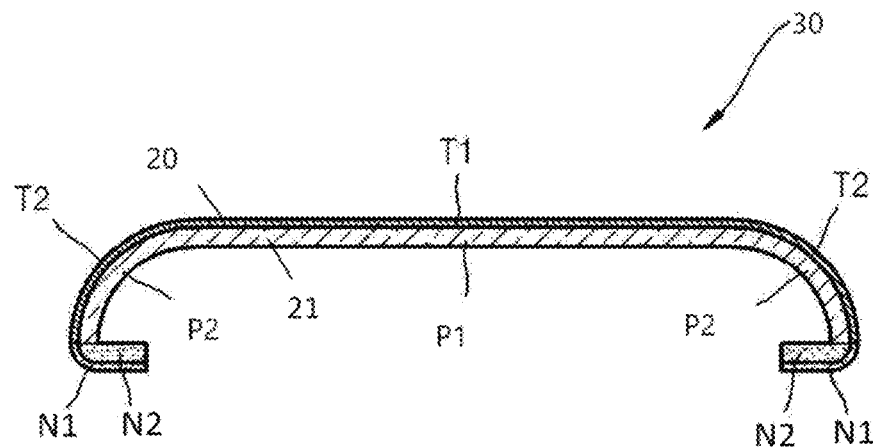
FIG. 7B is a schematic diagram of an electronic device provided by still other embodiments of the present disclosure.

In another example, as shown in FIG. 7B, the non-display region N2 of the display panel 21 and the non-touch region N1 of the touch panel 20 are both bent to the back surface of the touch display panel 30, so that a display effect of a narrow frame or even no frame can be realized.

For example, the display panel 21 may be a liquid crystal display panel, an organic light-emitting diode display panel, or an electronic paper display panel.

At least one embodiment of the present disclosure also provides a manufacturing method for manufacturing the touch panel. The manufacturing method includes forming a plurality of touch sensors in the first touch region T1 and the second touch region T2 respectively, and a distribution density of the plurality of touch sensors in the second touch region T2 along the bending direction of the bending region is higher than a distribution density of the plurality of touch sensors in the first touch region T1 along the first direction (a direction corresponding to the bending direction).

Figure 8A:
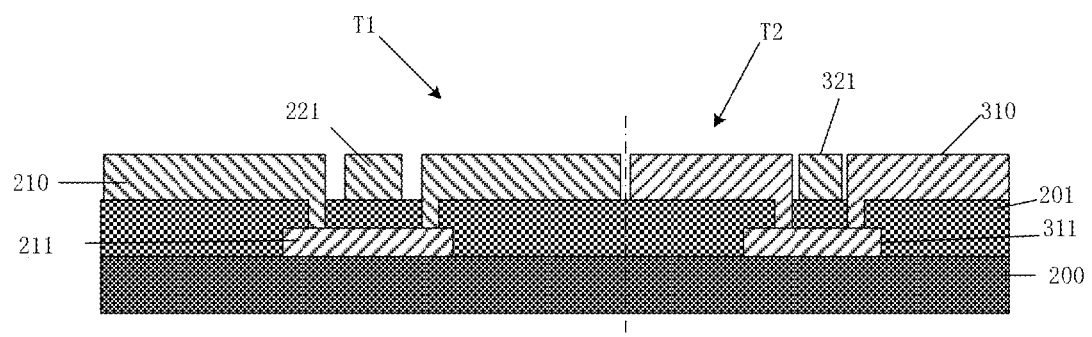
FIG. 8A is a cross-sectional diagram of the touch panel as shown in FIG. 3B along a section line X1-X2.
Figure 8B:
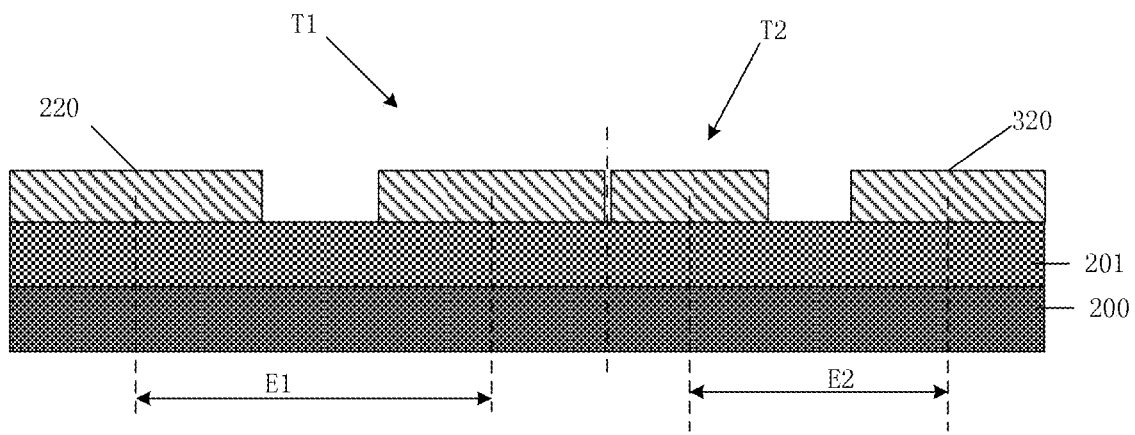
FIG. 8B is a cross-sectional diagram of the touch panel as shown in FIG. 3B along a section line Y1-Y2.

FIG. 8A shows a partial cross-sectional diagram of the touch panel as shown in FIG. 3B along a section line X1-X2, and FIG. 8B shows a partial cross-sectional diagram of the touch panel as shown in FIG. 3B along a section line Y1-Y2. Hereinafter, the manufacturing method for manufacturing the touch panel provided by the embodiment of the present disclosure will be exemplarily explained with reference to FIGS. 3A-3B and 8A-8B.

In an example, the manufacturing method includes at least the following steps S801-S803.

Step S801: forming a first main connection portion 211 on the substrate 200 corresponding to the first touch region T1 and forming a first auxiliary connection portion 311 on the substrate 200 corresponding to the second touch region T2.

For example, a first conductive layer is formed on the substrate 200 and the first main connection portion 211 and the first auxiliary connection portion 311 are formed by patterning the first conductive layer. For example, a material of the conductive layer is aluminum, molybdenum, copper, silver and other metal materials or alloy materials. For example, the material of the first conductive layer is silver palladium copper alloy (APC) material. For example, the patterning process is a conventional photolithography process, including photoresist coating, exposure, development, drying, etching and other steps.

For example, a center distance between adjacent first auxiliary connection portions 311 is less than a center distance between the first main connection portions 211.

For example, while patterning the first conductive layer, traces 240 are formed in the non-touch region N1 at the same time.

For example, a hardened layer and a shadow mask layer may be sequentially formed between the substrate 200 and the first conductive layer.

For example, the substrate 200 is a flexible substrate, and may be formed of a plastic material having excellent heat resistance and durability, for example. For example, polyimide (PI), polycarbonate (PC), polyethylene terephthalate (PET), polycarbonate, polyethylene, polyacrylate, polycarbonate, polyaryl compound, polyetherimide, polyethersulfone, polyethylene terephthalate (PET), polyethylene (PE), polypropylene (PP), polysulfone (PSF), polymethyl methacrylate (PMMA), cellulose triacetate (TAC), cycloolefin polymer (COP), cycloolefin copolymer (COC), and the like. Alternatively, the substrate 200 may be the flexible display panel itself, and the touch electrode is directly formed on the surface of the flexible display panel to obtain an integrated flexible touch display panel.

Step S802: forming an insulating layer 201 and forming via holes in the insulating layer. For example, the via holes respectively correspond to the first main connection portion 211 and the first auxiliary connection portion 311 and respectively exposes at least a portion of the first main connection portion 211 and the first auxiliary connection portion 311. For example, each first main connection portion 211/first auxiliary connection portion 311 correspondingly forms two via holes.

For example, the material forming the insulating layer 201 is an organic insulating material to obtain good bending resistance. For example, the organic insulating material is a transparent material. For example, the organic insulating material is OCA optical glue. For example, the organic insulating material may include polyimide (PI), acrylate, epoxy resin, polymethyl methacrylate (PMMA), and the like.

For example, the material forming the insulating layer is a photosensitive material, and forming the insulating layer at this time includes forming a photosensitive material layer, exposing and developing the photosensitive material layer to form the via holes, and then drying and curing the photosensitive material layer to form the insulating layer 201.

Step S803: forming a plurality of spaced-apart first main touch electrode portions 210 along the first direction D1 and a second main touch electrode 22 (including alternating second main touch electrode portions 220 and second main connection portions 221) along the second direction D2 on the insulating layer 201 corresponding to the first touch region T1, and forming a plurality of spaced-apart first auxiliary touch electrode portions 310 along the first direction D1 and a second auxiliary touch electrode 32 (including alternating second auxiliary touch electrode portions 320 and second auxiliary connection portions 321) along the second direction D2 on the insulating layer 201 corresponding to the second touch region T2. Each first main touch electrode portion 210 is electrically connected to a corresponding first main connection portion 211 through a via hole, thereby forming a first main touch electrode 21 extending along the first direction D1. Each first auxiliary touch electrode portion 310 is electrically connected to a corresponding first auxiliary connection portion 311 through a via hole to form a first auxiliary touch electrode 31 extending along the first direction D1. The plurality of first main touch electrodes 21 and the plurality of second main touch electrodes 22 cross each other to form a plurality of touch sensors, and the plurality of first auxiliary touch electrodes 31 and the plurality of second auxiliary touch electrodes 32 cross each other to form a plurality of touch sensors.

For example, a second conductive layer is formed on the insulating layer 201, and the second conductive layer is patterned to form the first main touch electrode portion 210 and the second main touch electrode 22 that are insulated from each other.

For example, along the second direction D2, a distribution density of the plurality of second auxiliary touch electrodes 32 is higher than a distribution density 22 of the plurality of second main touch electrodes. For example, as shown in FIG. 8B, a center distance E1 of the adjacent second main touch electrodes 22 is larger than a center distance E2 of the adjacent second auxiliary touch electrodes 32. For example, the center distance of adjacent second auxiliary touch electrodes 32 is ¼-¾ of the center distance of adjacent second main touch electrodes 32.

For example, as shown in FIGS. 3B and 8B, along the first direction D1, an average size of the second main touch electrode portion 220 is larger than an average size of the second auxiliary touch electrode portion 320. For example, along the first direction D1, the average size of the second auxiliary touch electrode portion 320 is ¼-¾ of the average size of the second main touch electrode portion 220.

Referring to FIG. 3B and FIG. 8A together, the first main touch electrode portion 210 is correspondingly formed between every two first main connection portions 211 and electrically connected to the two first main connection portions 211 through via holes, thereby forming a plurality of first main touch electrodes 21 extending along the first direction D1. The first auxiliary touch electrode portion 310 is correspondingly formed between every two first auxiliary connection portions 311 and is electrically connected with the two first auxiliary connection portions 311 through via holes, thereby forming a plurality of first auxiliary touch electrodes 31 extending along the first direction D1.

For example, a material of the second conductive layer is a transparent conductive material, and the transparent conductive material includes transparent conductive metal oxide materials, such as indium tin oxide (ITO), indium zinc oxide (IZO), zinc oxide (ZnO), aluminum zinc oxide (AZO), indium gallium zinc oxide (IGZO), etc.

In this way, the touch electrode structure of the touch panel 10 as shown in FIG. 3B is formed.

For example, the manufacturing method for manufacturing the touch panel may further include forming a protective layer to cover the touch electrode structure. For example, a material of the protective layer is transparent optical glue.

In another example, referring to FIGS. 5A-5C, the first main touch electrode portion 210, the first main connection portion 211, the second main touch electrode portion 220, the second main connection portion 221, the first auxiliary touch electrode portion 310, the first auxiliary connection portion 311, the second auxiliary touch electrode portion 320, and the second auxiliary connection portion 321 are formed by a same conductive layer through a same patterning process and are insulated from each other. A first main connection bridge 212, a second main connection bridge 222, a first auxiliary connection bridge 312 and a second auxiliary connection bridge 322 are formed through another conductive layer, the first main connection bridge connects the first main touch electrode portion 210 and the first main connection portion 211 to form the first main touch electrode 21, the second main connection bridge 222 connects the second main touch electrode portion 220 and the second main connection portion 212 to form the second main touch electrode 22, the first auxiliary connection bridge 312 connects the first auxiliary touch electrode portion 310 and the first auxiliary connection portion 311 to form the first auxiliary touch electrode 31, and the second auxiliary connection bridge 322 connects the second auxiliary touch electrode portion 320 and the second auxiliary connection portion 321 to form the second auxiliary touch electrode 32.

For example, the manufacturing method for manufacturing the touch panel may further include bending the second touch region T2 relative to the first touch region T1 along the bending direction C to form the bending region BA. For example, in this step, the bending region BA is formed into a curved surface structure whose cross-sectional shape is a circumference having a predetermined curvature radius or a portion of an ellipse. For example, a better grip and aesthetic feeling can be obtained by selecting an appropriate curvature radius. This step forms the touch panel as shown in FIG. 3A.

For example, the manufacturing method for manufacturing the touch panel further includes bending the non-touch region N1 to a back surface of the touch panel 20 relative to the second touch region T2 (see FIG. 6). For example, the non-touch region N1 is parallel to the first touch region T1. In this way, a touch panel structure with a narrow frame or even no frame can be realized without reducing the wiring region of the non-touch region N1.

What have been described above merely are specific implementations of the present disclosure, but the protective scope of the present disclosure is not limited to this case. The protective scope of the present disclosure is determined by the appended claims.

What is claimed is:

1. A touch panel, comprising a main body region and a bending region, wherein the bending region is a region which extends from the main body region along a first direction, and bends relative to the main body region,
    the main body region comprises a first touch region, the bending region comprises a second touch region, and
    a distribution density of touch sensors in the second touch region along a bending direction of the bending region is higher than a distribution density of touch sensors in the first touch region along the first direction;
    wherein the first touch region comprises a plurality of first main touch electrodes extending along the first direction and a plurality of second main touch electrodes extending along a second direction, and the plurality of first main touch electrodes and the plurality of second main touch electrodes cross each other to form the touch sensors in the first touch region, the second direction is orthogonal to the first direction; and
    the second touch region comprises a plurality of first auxiliary touch electrodes extending along the first direction and a plurality of second auxiliary touch electrodes extending along the bending direction, and the plurality of first auxiliary touch electrodes and the plurality of second auxiliary touch electrodes cross each other to form the touch sensors in the second touch region;
    wherein a center distance between adjacent second main touch electrodes is greater than a center distance between adjacent second auxiliary touch electrodes;
    wherein the center distance between the adjacent second auxiliary touch electrodes is 1/4-3/4 of the center distance between the adjacent second main touch electrodes.

2. The touch panel according to claim 1, wherein a distribution density of the plurality of second auxiliary touch electrodes along the bending direction is higher than a distribution density of the plurality of second main touch electrodes along the first direction.

3. A touch panel, comprising a main body region and a bending region, wherein the bending region is a region which extends from the main body region along a first direction, and bends relative to the main body region,
    the main body region comprises a first touch region, the bending region comprises a second touch region, and
    a distribution density of touch sensors in the second touch region along a bending direction of the bending region is higher than a distribution density of touch sensors in the first touch region along the first direction;
    wherein the first touch region comprises a plurality of first main touch electrodes extending along the first direction and a plurality of second main touch electrodes extending along a second direction, and the plurality of first main touch electrodes and the plurality of second main touch electrodes cross each other to form the touch sensors in the first touch region, the second direction is orthogonal to the first direction; and
    the second touch region comprises a plurality of first auxiliary touch electrodes extending along the first direction and a plurality of second auxiliary touch electrodes extending along the bending direction, and the plurality of first auxiliary touch electrodes and the plurality of second auxiliary touch electrodes cross each other to form the touch sensors in the second touch region;
    wherein a center distance between adjacent second main touch electrodes is greater than a center distance between adjacent second auxiliary touch electrodes;
    wherein each first auxiliary touch electrode of the plurality of first auxiliary touch electrodes comprises a plurality of first auxiliary touch electrode portions and a plurality of first auxiliary connection portions which are alternately distributed along the first direction, and each second auxiliary touch electrode of the plurality of second auxiliary touch electrodes comprises a plurality of second auxiliary touch electrode portions and a plurality of second auxiliary connection portions which are alternately distributed along the bending direction;
    adjacent first auxiliary touch electrode portions are electrically connected to a first auxiliary connection portion between the adjacent first auxiliary touch electrode portions through a first auxiliary connection bridge, respectively, to be connected to each other, and adjacent second auxiliary touch electrode portions are electrically connected to a second auxiliary connection portion between the adjacent second auxiliary touch electrode portions through a second auxiliary connection bridge, respectively, to be connected to each other; and the plurality of first auxiliary connection portions and the plurality of second auxiliary connection portions are respectively located at a plurality of intersections of the first auxiliary touch electrode and the second auxiliary touch electrode, wherein each first auxiliary connection portion of the plurality of first auxiliary connection portions has a closed annular structure, each second auxiliary connection portion of the plurality of the second auxiliary connection portions is located within the annular structure and insulated from the first auxiliary connection portion, and the plurality of first auxiliary touch electrode portions, the plurality of first auxiliary connection portions, and the plurality of second auxiliary touch electrode portions and the plurality of second auxiliary connection portions are all arranged in a same layer and made of a same material.

4. The touch panel according to claim 3, wherein the first auxiliary connection bridge and the second auxiliary connection bridge are arranged in a same layer and made of a same material, and are located on different layers from the first auxiliary connection portion and the second auxiliary connection portion, and
a conductivity of the first auxiliary connection bridge and the second auxiliary connection bridge is higher than a conductivity of the first auxiliary connection portion and the second auxiliary connection portion.

5. A touch panel, comprising a main body region and a bending region, wherein the bending region is a region which extends from the main body region along a first direction, and bends relative to the main body region,
the main body region comprises a first touch region, the bending region comprises a second touch region, and
a distribution density of touch sensors in the second touch region along a bending direction of the bending region is higher than a distribution density of touch sensors in the first touch region along the first direction;
wherein the bending region further comprises a third touch region, a curvature of the third touch region is greater than a curvature of the second touch region, and
along the bending direction, a distribution density of touch sensors in the third touch region is higher than the distribution density of the touch sensors in the second touch region.

6. The touch panel according to claim 1, wherein the first auxiliary touch electrode and the second auxiliary touch electrode comprise a transparent conductive material or a metal grid pattern.

7. An electronic device, comprising the touch panel according to claim 1.

8. A manufacturing method for manufacturing the touch panel according to claim 5, and the manufacturing method comprising:
forming a plurality of touch sensors in the first touch region and a plurality of touch sensors in the second touch region respectively.

9. The manufacturing method according to claim 8, wherein forming the plurality of touch sensors in the first touch region and the plurality of touch sensors in the second touch region respectively comprises:
forming a plurality of first main touch electrodes extending along the first direction and a plurality of second main touch electrodes extending along a second direction in the first touch region, so as to form the plurality of touch sensors in the first touch region at intersections of the plurality of first main touch electrodes and the plurality of second main touch electrodes, wherein the second direction is orthogonal to the first direction; and
forming a plurality of first auxiliary touch electrodes extending along the first direction and a plurality of second auxiliary touch electrodes extending along the second direction in the second touch region, so as to form the plurality of touch sensors in the second touch region at intersections of the plurality of first auxiliary touch electrodes and the plurality of second auxiliary touch electrodes.

10. The manufacturing method according to claim 9, wherein along the first direction, a distribution density of the plurality of second auxiliary touch electrodes is higher than a distribution density of the plurality of second main touch electrodes.

11. The manufacturing method according to claim 9, wherein
forming the plurality of first auxiliary touch electrodes comprises: forming a plurality of first auxiliary touch electrode portions and a plurality of first auxiliary connection portions which are alternately distributed along the first direction,
forming the plurality of second auxiliary touch electrodes comprises: forming a plurality of second auxiliary touch electrode portions and a plurality of second auxiliary connection portions which are alternately distributed along the second direction,
wherein adjacent first auxiliary touch electrode portions are electrically connected to a first auxiliary connection portion formed between the adjacent first auxiliary touch electrode portions through a first auxiliary connection bridge, respectively, to be connected to each other, and adjacent second auxiliary touch electrode portions are electrically connected to a second auxiliary connection portion formed between the adjacent second auxiliary touch electrode portions through a second auxiliary connection bridge, respectively, to be connected to each other;
the plurality of first auxiliary connection portions and the plurality of second auxiliary connection portions are respectively formed at a plurality of intersections of the first auxiliary touch electrode and the second auxiliary touch electrode; and
each of the plurality of the first auxiliary connection portion has a closed annular structure, each of the plurality of the second auxiliary connection portion is formed in the annular structure and insulated from the first auxiliary connection portion, and the plurality of first auxiliary touch electrode portions, the plurality of first auxiliary connection portions, the plurality of second auxiliary touch electrode portions and the plurality of second auxiliary connection portions are formed in a same patterning process.

12. The manufacturing method according to claim 8, further comprising: bending the second touch region relative to the first touch region along the bending direction to form the bending region.

13. The touch panel according to claim 2, wherein a center distance between adjacent second main touch electrodes is greater than a center distance between adjacent second auxiliary touch electrodes.

* * * * *

UNITED STATES PATENT AND TRADEMARK OFFICE
CERTIFICATE OF CORRECTION

| | |
|---|---|
| PATENT NO. | : 11,494,041 B2 |
| APPLICATION NO. | : 16/958967 |
| DATED | : November 8, 2022 |
| INVENTOR(S) | : Niu et al. |

It is certified that error appears in the above-identified patent and that said Letters Patent is hereby corrected as shown below:

In the Claims

Column 17, Line 51 change, "A manufacturing method for manufacturing the touch panel according to claim 5, ..." to: -- A manufacturing method for manufacturing the touch panel according to claim 1, ... --

Signed and Sealed this
Fourth Day of April, 2023

Katherine Kelly Vidal
*Director of the United States Patent and Trademark Office*